INVENTOR
James H. Bostock
James E. Reagan
ATTORNEYS

INVENTORS
James H. Bostock
James E. Reagan

Aug. 22, 1967
J. H. BOSTOCK ET AL
3,336,945
SELF-CYCLING TIMING VALVE DEVICE
Filed May 17, 1965
5 Sheets-Sheet 4
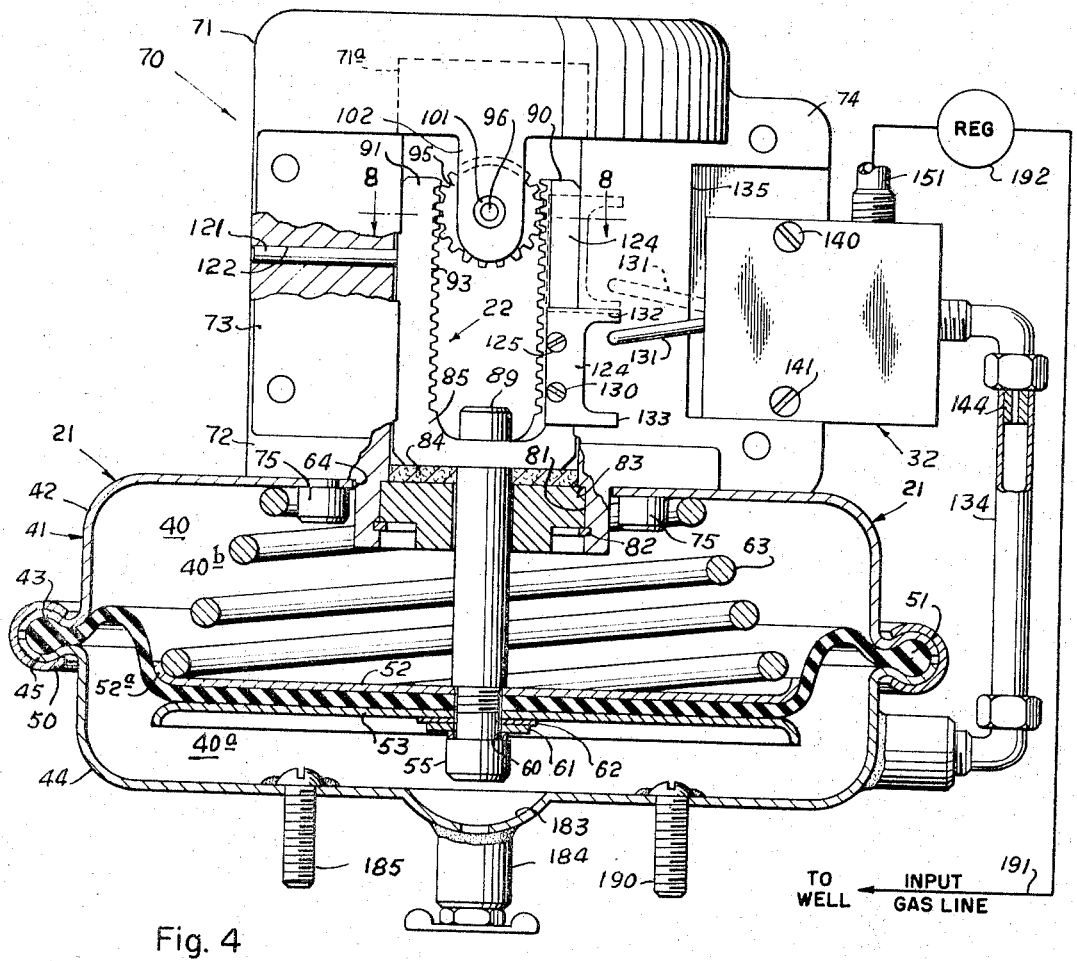
Fig. 4
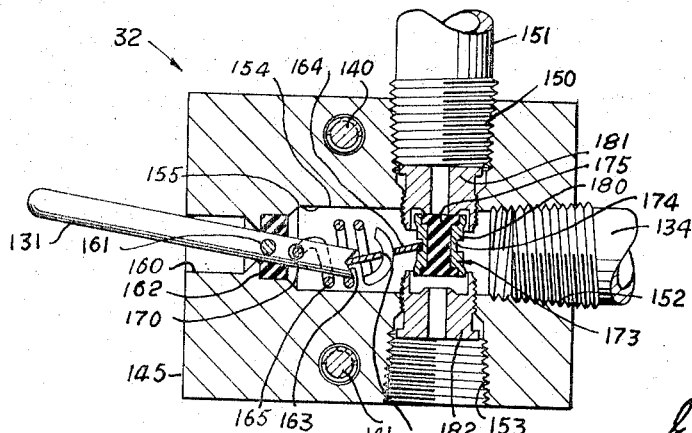
Fig. 6
Fig. 9
INVENTOR
James H. Bostock
James E. Reagan
BY
ATTORNEYS INVENTORS
James H. Bostock
James E. Reagan

BY

ATTORNEYS

United States Patent Office 3,336,945
Patented Aug. 22, 1967

3,336,945
SELF-CYCLING TIMING VALVE DEVICE
James H. Bostock and James E. Reagan, Dallas, Tex., assignors to Otis Engineering Corporation, Dallas, Tex., a corporation of Delaware
Filed May 17, 1965, Ser. No. 456,312
5 Claims. (Cl. 137—624.14)

This invention relates to timing devices and more particularly relates to fluid actuated timing devices.

It is an object of this invention to provide a new and improved fluid actuated timing device.

It is another object of this invention to provide a timing device driven by a substantially constant supply of fluid under pressure to produce timed mechanical movement.

It is a further object of this invention to provide a fluid actuated timing device employing a single diaphragm which is displaced in one direction by a supply of fluid under pressure and in the opposite direction by a spring.

It is a further object of this invention to provide a fluid actuated timing device which meters fluid flow into a pressure chamber for displacing a diaphragm to produce periodic mechanical movement.

It is a further object of the invention to provide a fluid actuated timing device in which the reciprocating action of a flexible diaphragm is translated into rotational motion to drive a timing wheel.

It is a still further object of the invention to provide a fluid actuated timing device in which the longitudinal motion of a shaft generated by a reciprocating diaphragm is used to actuate a valve controlling a supply of metered fluid to the diaphragm.

It is a still further object of the invention to provide a fluid actuated timing device operable on an adjustable time cycle.

It is another object of the invention to provide a fluid actuated timing device having a cycle of operation controllable in response to changes in the quantities of the metered fluid supplied to the device.

It is a further object of the invention to provide a fluid actuated timing device having a pressure chamber into which a driving fluid is metered for displacing a diaphragm in one direction and out of which the driving fluid is metered during exhaust of the fluid from the chamber while the diaphragm is being displaced in the other direction by a spring.

It is a still further object of the invention to provide a fluid actuated timing device which may be employed to power clocks, recorders, and other related mechanism including such apparatus as valves.

It is a still further object of the invention to provide a timing device which is continuously operable so long as fluid under pressure is supplied to the device.

It is another object of the invention to provide a timing device which replaces conventional clock-driven units eliminating the problem of frequent windings.

It is a still further object of the invention to provide a fluid actuated timing device utilizing a three-way, two-position valve for flow control between three conduits whereby in one position of the valve fluid is supplied to a pressure chamber to displace a diaphragm in one direction and in another position of the valve the fluid is exhausted from the chamber to permit the diaphragm to return to its initial position.

It is another object of the invention to provide a fluid actuated timer for performing a plurality of separate timing functions from a single pressure unit.

Additional objects and advantages of the invention will be readily apparent from the reading of the following description of a device constructed in accordance with the invention, and reference to the accompanying drawings thereof, wherein:

FIGURE 4 is a left-hand end view partly in elevation and partly in section of the device of FIGURE 1 with the base plate removed showing only the pressure chamber, the motion translating assembly, and the drive fluid control valve with the conduit to the pressure chamber;

FIGURE 6 is a view in section of the three way valve as seen in a plane parallel to the plane of FIGURE 4;

FIGURE 9 is a plan view of the valve link used in the control valve of the timing device;

FIGURE 10 is a diagrammatic plan view of a gas lift system including the timing device of the invention; and FIGURE 11 is a fragmentary diagrammatic view in elevation of the timing device adapted to perform a plurality of timing functions from several timing wheels.

Figure 3:
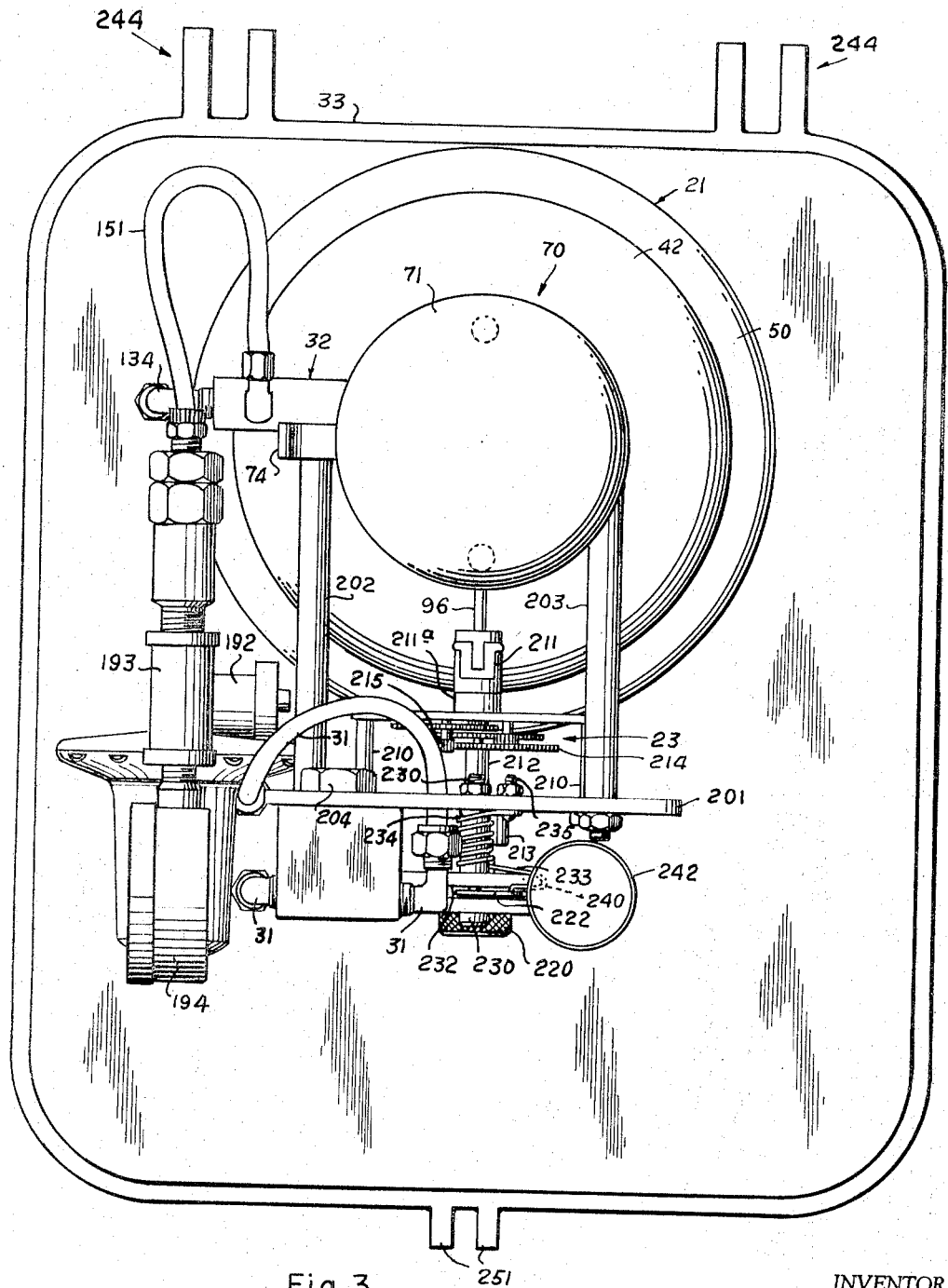
FIGURE 3 is a top plan view of the timing device of FIGURE 1.

Referring to the drawings, the timing device 20 includes a fluid actuated diaphragm power assembly 21 which operates a motion translation assembly 22 to convert the reciprocating action of the diaphragm into rotating motion to drive the gear train 23, as in FIGURE 3, which rotates the timing wheel 24. The timing wheel oscillates a trip assembly 25 which intermittently opens and closes a pilot valve 30 to provide a timed sequence control of fluid flow through a conduit 31 for controlling a motor valve, not shown, in a system for injecting lift gas into an oil well or for operation of other automatic equipment. Fluid flow control to exhaust of fluid from the diaphragm assembly is provided by the valve 32 actuated by the motion translation assembly driven by the diaphragm which is displaced in an upward direction by fluid pressure and returned in a downward direction by spring action. The complete timing device is supported on a base 33 mounted on a stanchion 34.

Referring to FIGURE 4 the flexible diaphragm 35 is secured within the chamber 40 of the housing 41. The housing 41 comprises an upper cup shaped section 42 having an annular outwardly extending curved annular flange 43 and a lower cup shaped section 44 having an outwardly extending annular curved flange 45. The sections of the housing are secured together by a clamp 50 which is generally tubular in shape and split along its length to fit around the housing over the curved flanges 43 and 45. The clamp 50 preferably is in the form of a split ring having a substantially circular cross-section which is split or slotted along its inner circumference so that the clamp may be spread apart both circumferentially and sectionally to fit around the housing over the curved annular flanges of the housing section as shown in FIGURE 4. The circumferential bead 51 formed around the diaphragm 35 is clamped between the flanges 43 and 45 to hold the diaphragm across the chamber 40 dividing it into a lower pressure chamber 40a and an upper spring chamber 40b. The diaphragm is formed of a relatively soft, flexible material, such as rubber, which is of sufficient size and flexibility to permit the require displacement of the diaphragm and support the pressure of the fluid employed in displacing the diaphragm. The clamp 50 fits over the flanges 43 and 45 and resiliently presses the flanges against the bead 51 so that the joint between the bead and the flanges is sealed to prevent fluid leakage from the chamber.

A substantial portion of the diaphragm over a central circular section is clamped between the saucer shaped circular plates 52 and 53 which are secured to the shaft 54 by a socket head screw 55 extending through the center of the plates and the diaphragm into the shaft. The plates permit fluid pressure in chamber 40a to displace the diaphragm enlarging the chamber and moving the shaft upwardly. In the absence of the plates the diaphragm could deform around the shaft without moving it the required distance. The wrinkled portion of the diaphragm around the plates within the head allows enough movement of the clamped portion to displace the shaft the required distance. The edge of each of the plates 52a and 53a is rolled away from the diaphragm to avoid contact of the sharp edges of the plates with the diaphragm as it is flexed in each direction. In the position of FIGURE 4 the diaphragm folds smoothly over the edge of the plate 52. The washers 60, 61 and 62 are positioned on the screw 55 between the head of the screw and the plate 53. The washers 60 and 62 are preferably formed of a plastic material such as nylon while the washer 61 is a metal washer.

The diaphragm 35 is biased downwardly to the position shown in FIGURE 4 by the coil spring 63 which is confined between the plate 52 and the inner surface of the upper section 42 of the housing. The spring is formed in the shape of a segment of a cone so that each of the inner coils of the spring will nest within an immediately adjacent outer coil on one side and around an immediately adjacent inner coil to permit the spring to compress to a minimum depth thereby providing for maximum displacement of the diaphragm and thus maximum movement of the diaphragm shaft. The bottom coil of the spring fits within the lip 52a of the plate 52 to aid in keeping the spring in position.

The upper section 41 of the housing is provided with a central circular opening 64 to receive the downwardly extending annular flange 65 formed on the base 72 of the support frame assembly 70. The frame assembly may be cast as a unitary structure, comprises the head member 71 which is counterbored to provide an open chamber 71a and is secured to the base member 72 by the vertical support members 73 and 74. The frame assembly is secured on the housing 41 by a plurality of socket head cap screws 75 which are threaded into the base member through the upper section 42.

A bushing 80 around the shaft 54 is held within the bore 81 of the base member 72 by a split snap ring 82 whose outer peripheral portions are received in an internal annular recess of the base member. The bushing is held against upward movement within the bore by engagement with the internal annular downwardly facing shoulder 83 in the bore of the base member. A washer shaped wiper 84, preferably formed of a material such as felt, is positioned within the bore 81 on the upper face of the bushing around the shaft 54. The outside diameter of the wiper is larger than the bore 81 above the shoulder 83 so the wiper is forced or squeezed into place and will remain positioned while the shaft 54 reciprocates through it and is wiped by the wiper to prevent foreign matter from entering the upper chamber 40b along the shaft. The shaft 54 is loosely fitted through the bushing since the upper chamber 40b is not a pressure tight chamber. In fact, it is preferred that air readily flow into and out of the chamber around the shaft as the diaphragm 35 moves upwardly and downwardly so that the rate of movement of the diaphragm will not be affected by increases and decreases in the pressure within the upper chamber.

Figure 7:
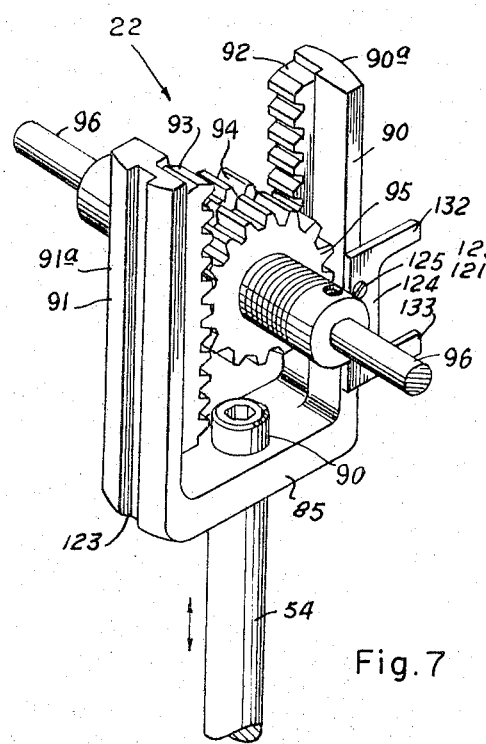
FIGURE 7 is a fragmentary view in elevation of the motion translation assembly for converting the longitudinal motion of the diaphragm to rotating motion.
Figure 8:
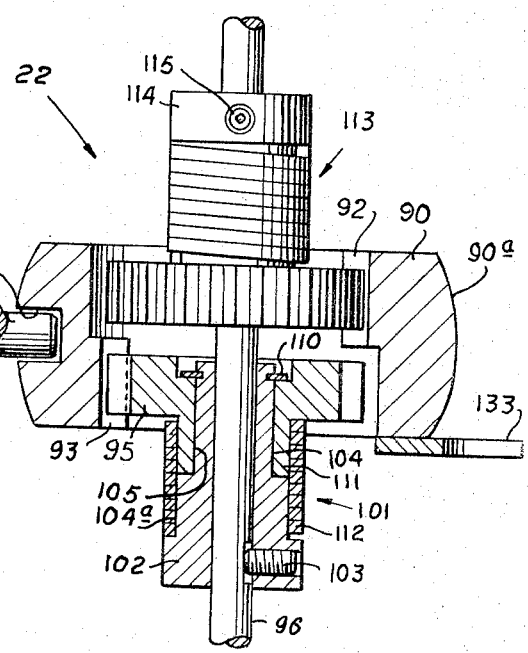
FIGURE 8 is a view partly in section and partly in elevation of the motion translation assembly taken along the line 8—8 of FIGURE 4.

The motion translation assembly 22, as seen in FIGURES 4, 7, and 8, is supported on and operated by the shaft 54 to translate the reciprocating action of the shaft into rotational motion to drive the timing wheel 24. The bifurcated or forked member 85 is connected to the upper end of the shaft 54 by the socket head screw 89. The bifurcated member includes the parallel arms 90 and 91 which are provided with the racks 92 and 93, respectively. The racks 92 and 93 mesh with the pinion gears 94 and 95, respectively, which are mounted on the drive shaft 96. The shaft 96 is supported in the bushings 97 through the shaft hangers 98 and 99 formed on the bottom face of the head member 71 of the support frame 70. The racks 92 and 93, as best illustrated in FIGURES 7 and 8, face each other and are displaced from each other in different vertical planes so that the pinion gears may be both mounted on the shaft and each of the gears mesh with only one of the racks. The pinion gears are operatively connected with the shaft 96 by spring clutch assemblies whereby the shaft is rotatable in a single direction by each of the pinions which are driven by the reciprocating motion of the racks on the bifurcated member responsive to the vertical displacement of the diaphragm. The pinion 95 is operatively engaged with the shaft 96 through the spring clutch assembly 101 which includes a hub 102 secured on the shaft 96 by a set screw 103. The hub is reduced in diameter along an inner section 104 which forms a slip fit within the bore 105 of the pinion so that the pinion may freely rotate around the hub when the pinion is not actually driving the hub. The pinion is locked on the hub by a split lock ring 110. An annular flange 111 is formed on the pinion 95 and extends over a portion of the reduced section 104 of the hub as shown in FIGURE 8. A tightly wound coil spring 112 is disposed around the flange 111 and the enlarged section 104a of the hub 102. The coil spring functions as a clutch interconnecting the pinion and the hub so that the hub is driven by the pinion to rotate the shaft. When the pinion is rotated by the rack in a direction which tends to more tightly coil the spring 112, the inside surfaces of the coils of the spring grip the external surfaces of the flange 111 on the pinion and the hub section 104a effecting a rigid connection or link between the pinion and the hub by the spring to drive the shaft. When the pinion is rotated in a direction which tends to uncoil the spring, the coils of the spring move slightly away from the surfaces of the flange and hub and the spring ceases to serve as a linkage between the pinion and the hub permitting the pinion to "free-wheel" around the hub. The pinion 94 is similarly operatively connected with the shaft 96 by the clutch assembly 113 which includes the hub 114 secured to the shaft by the set screw 115 and the coil spring 120 forming the clutch connection between the pinion and the hub in a manner identical to the clutch assembly 101. The other features of the clutch assembly 113 are exactly the same as those of the clutch assembly 101 and thus have not been shown in detail. In FIGURE 8, the pinion 94 is rotated so that the left side of the pinion moves toward the observer as the rack 92 moves away from the observer. The spring 120 is coiled tighter and thus engages the hub 114 to rotate the hub and the shaft. When the rack 92 moves toward the observer, the pinion 94 is rotated so that the right side of the pinion moves toward the observer to uncoil the spring 120 slightly causing disengagement of the pinion from the hub so that the pinion "free-wheels" around the hub. The coil springs 112 and 120 are so oriented that rotation of the pinions as the racks are reciprocated by the member 85 causes the shaft to rotate in a single direction. In the motion translation assembly illustrated, the coil springs are associated with the pinions and the hubs in such a manner that reciprocation of the bifurcated member 85 causes clockwise rotation of the shaft 96 as viewed in FIGURE 7.

Figure 5:
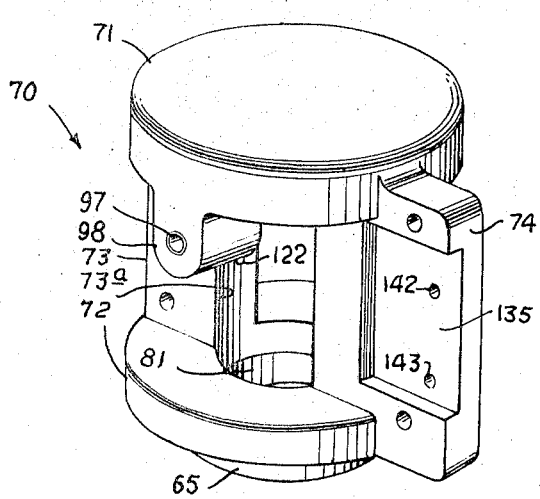
FIGURE 5 is a perspective view in elevation showing the support bracket assembly for supporting the motion translating assembly and the timing wheel apparatus.

A guide pin 121 is press fitted through the hole 122 extending through the vertical support member 73. The inward end of the guide pin is received in the vertical slot 123 extending along the length of the outside face of the arm 91 of the bifurcated member to guide the member as it reciprocates within the members 73 and 74 to drive the pinion gears. Additional aid in guiding the bifurcated member is provided by the arcuate vertical outside faces 90a and 91a of the arms 90 and 91, respectively, which fit within the inner concave arcuate edges of the vertical support members 73 and 74. As shown in FIGURE 5, the vertical support member 73 has an inner vertical arcuate edge 73a which conforms to and fits in sliding relationship over the face 91a of the arm 91. The inner vertical edge of the support member 74 is similarly curved to conform to the face 90a of the arm 90.

A C-shaped bracket 124 is secured to the arm 90 of the bifurcated member by the screws 125 and 130. As the shaft 54 and the member 85 are reciprocated by the diaphragm, the bracket 124 engages the valve lever 131 of the three way valve 32. When the bracket 124 moves downwardly, the upper arm 132 of the bracket engages the valve lever 131 to move it to its lowermost position as illustrated in FIGURE 4. The lower arm 133 of the bracket engages the valve lever 131 as the bifurcated member moves upwardly to move the valve lever to its uppermost position as shown by the broken line representation of the valve lever in FIGURE 4. Also, in FIGURE 4 the bracket is represented by broken lines in the uppermost position.

The three-way control valve 32 functions to admit driving fluid into the chamber 40a and to permit the fluid to be exhausted from the chamber through the conduit 134 extending between the valve and the chamber. The valve 32 is mounted in the recess 135 of the vertical support member 74 by the screws 140 and 141 which extend through the body of the valve into the holes 142 and 143 of the support member. A metering orifice unit or choke bean 144 is fitted within the conduit 134 to meter the supply fluid both into and out of the chamber.

A suitable form of three-way, two position, valve 32 which may be employed to control fluid supply and exhaust through the conduit 134, is illustrated in detail in FIGURE 6. The valve body 145 is provided with an internally threaded inlet flow passage 150 into which the supply conduit 151 is connected. The valve body is also provided with a threaded outlet flow passage 152 into which the conduit 134 is connected and an internally threaded exhaust flow passage 153, the axis of which is coincident with the axis of the supply flow passage 150. The outlet flow passage 152 extends along an axis transverse to the axis of the passages 150 and 153 and connects with a bore 154 extending into the valve body and having an inner enlarged section 155 forming a spring chamber and an outer reduced section 160 through which the valve lever 131 extends into the valve body. At the juncture of the inner section 155 and the outer section 160 of the bore 154, the bore is just large enough to permit the valve lever to pass through with sufficient space around the lever to permit its pivotal movement between the upper and lower positions represented in FIGURE 4. The valve lever is pivotally secured to the valve body by the pin 161.

A seal member 162 is fitted within the bore 154 around the lever at its pivot point to seal against leakage out of the valve body along the lever. The inward end of the valve lever is provided with a conical recess 163 to receive the outward end of a valve link 164, shown in FIGURE 9, which is operatively secured with the valve lever by the coil spring 165 encircling both the lever and link. The spring 165 is hooked at its outward end into the hole 170 through the valve lever and at its inward end through the hole 171 in the valve link. The inward end of the valve link is bifurcated, as at 172, to receive the valve member 173 which has a centrally positioned annular recess 174 into which the bifurcated portion of the valve link fits. The valve element is formed by a central spool shaped resilient core 175 within an annular rigid body 180. The core 175 of the valve member is confined between and engageable at opposite ends with the valve seats 181 and 182 which are threaded into the flow passages 150 and 153, respectively. Each of the valve seats is provided with a central opening through which fluid may flow. The valve element is fairly closely fitted within the inward ends of the valve seats so that the element is held substantially in alignment as shown but permits fluid flow around one end of the element within the valve seat when the element is seated at the opposite end against the other valve seat. The valve is a low volume type and need not permit any substantial volume of flow.

The spring interconnected valve lever and valve link provides a snap action which accelerates the movement of the valve element between positions. The spring 165 exerts a pulling force between the valve lever 131 and the valve link 164 at the holes 170 and 171, respectively, tending to fold the lever and link toward each other when not in a straight line relationship. In the position shown in FIGURE 6, the valve element 180 is in the upper position seated against and closing off flow through the valve seat 181 and permitting flow between the flow passages 152 and 153 around the valve element through the valve seat 182. When the valve lever 131 is lowered straightening out the connection between the valve link and the valve lever at the conical recess 163, the valve element will snap to the downward position as soon as the valve lever and valve link pass the straight line relationship at which time the spring 165 draws the holes 170 and 171 in the lever and link closer together. The inward end of the valve lever and the outward end of the valve link at the recess 163 move to an upward position while the bifurcated end 172 of the valve link moves downward with the link pivoting about the connection with the spring at the hole 171 to move the valve element 180 downward against the valve seat 182 to close off flow through the valve seat and permit flow through the valve seat 181 between the flow passages 150 and 152.

In the position shown in FIGURE 6, the control valve 32 permits fluid to exhaust from the chamber 40a through the conduit 134 to the atmosphere passing through the flow passage 152 into the valve and around the valve element 180 out of the valve through the valve seat 182 and the flow passage 153. When the valve lever 131 is shifted to the downward position illustrated in FIGURE 4, the valve element 173 is moved downwardly into engagement with the valve seat 182 to allow fluid to flow from the conduit 151 through the valve seat 181, around the valve element 180, and into the conduit 134 through the passage 152.

The lower section 44 of the housing 41 is provided with a bowl shaped recess 183 to collect any liquids which may condense within the chamber 40a which are then drained from the chamber through the valve 184.

The housing 41 is secured to the base 33 by the screws 185 and 190 which extend through the lower section 44 of the housing and are welded around their heads to the inner surface of the housing to prevent leakage from the chamber 40a around the screws.

Figure 1:
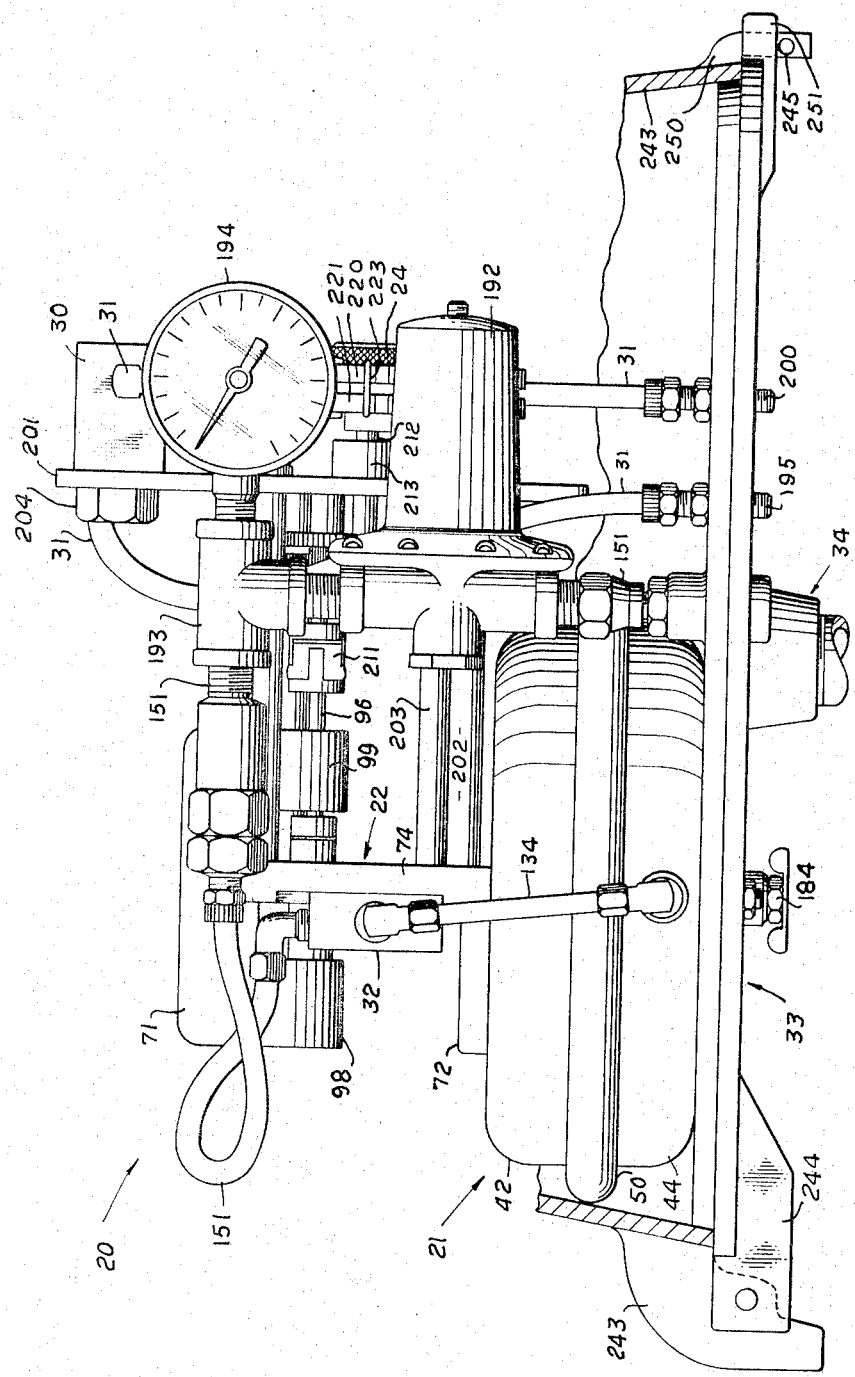
FIGURE 1 is a side view in elevation illustrating a timing device constructed in accordance with the invention.

The conduit 151, which carries driving fluid to the valve 32 for displacing the diaphragm upwardly, comprises suitable couplings and other connecting members extending through the base 33, as shown in FIGURE 1, to a suitable gas supply line 191, which may also conduct lift gas to an oil well where the timing device is being used to control a gas lift operation. A pressure regulator 192 is connected in the conduit 151 between the base and the control valve 32 to reduce the pressure of the gas from the line 191 to the level required for proper operation of the timing device. The pressure regulator may be any suitable device which will reduce fluid pressure to the relatively low level required by the timing device. For example, one model of the timing device operates on a gas pressure as low as 6 p.s.i. Also, in the conduit 151 is a T-shaped conduit 193 to which a pressure regulator 194 is connected for indicating the pressure of the fluid flowing through the conduit 151 to the control valve.

The conduit 31, which carries the fluid flow directly controlled by the timing device, is connected at opposite ends through the base 33 extending through the valve 30. The trip assembly 25 actuates the valve 30 responsive to the movement of the timing wheel to control the length and frequency of the intervals during which the valve allows fluid to flow through the conduit 31. The fluid to be directly controlled by the timing device enters the conduit 31 at the inlet connection 195 and after passing through the conduit and the valve 30, leaves the timing device at the outlet connection 200.

The timing wheel 24, the trip assembly 25, and the pilot valve 30 are all supported on the mounting plate 201 which is connected to the vertical support members 73 and 74 of the frame assembly. The mounting plate is secured on the mounting studs 202 threaded into the member 74 and the mounting studs 203 threaded into the member 73. The valve 30 is held on the mounting plate by the nut 204 which is threaded on a stud, not shown, formed on the valve body and extending through the plate.

The gear assembly 23 is supported on a second mounting plate 205 secured to the back side of the mounting plate 201 by the mounting studs 210. The shaft 96 of the motion translation assembly is connected by the coupling 211 to the input shaft 211a of the gear assembly. The timing wheel 24 is rigidly mounted on the output shaft 212 of the gear assembly which extends rotatably through the hub 213 mounted on the face of the mounting plate 201. A gear 214 on shaft 212 is driven by the ing pinion 215 of the gear assembly to rotate the timing wheel. The timing wheel is held on the shaft 212 by the knurled nut 220. It will be apparent that the gear assembly is a speed reducing transmission in that the speed of rotation of its input shaft is much greater than the speed of rotation of its output shaft.

Figure 2:
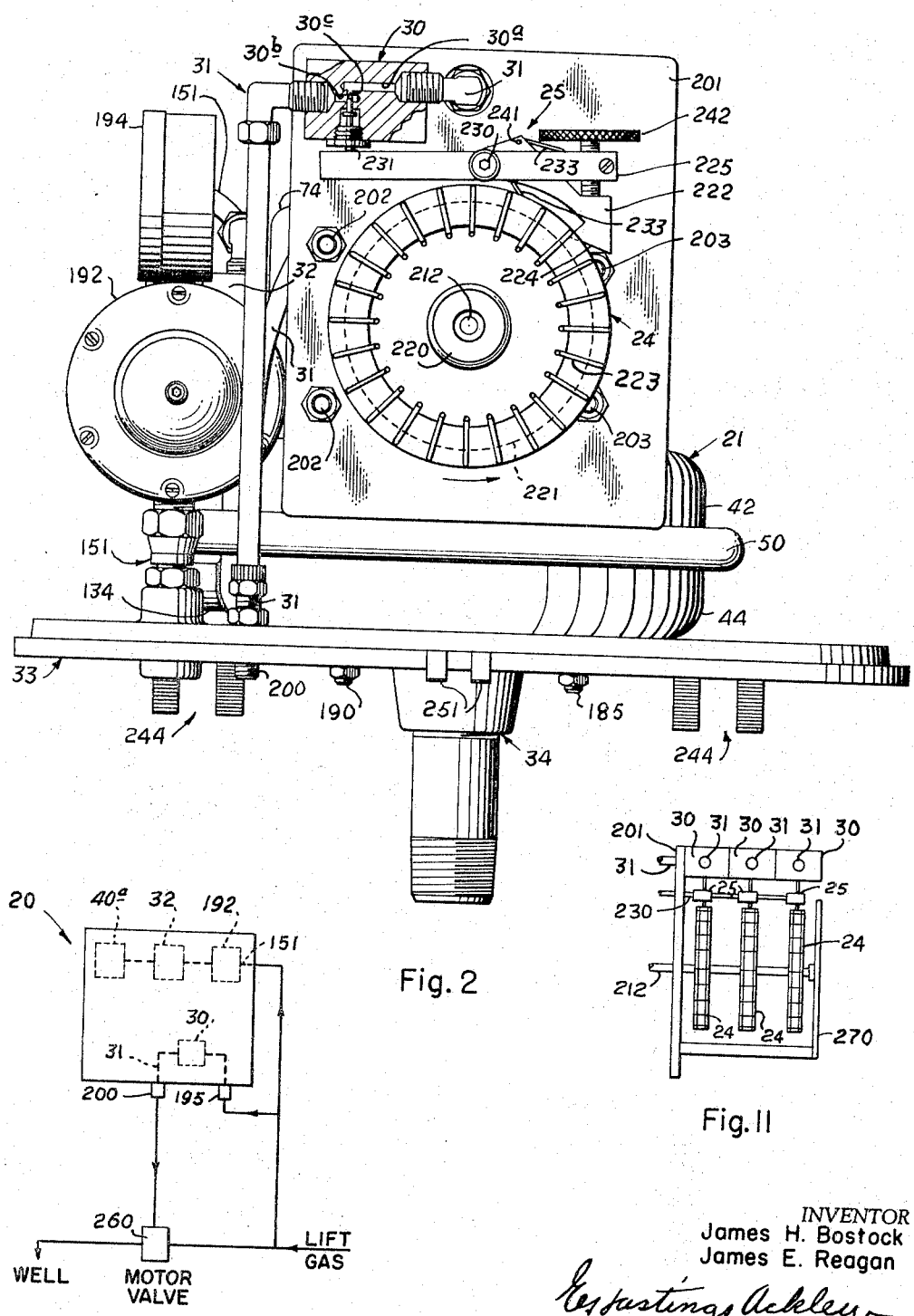
FIGURE 2 is a right-hand end view in elevation of the timing device of FIGURE 1.

The timing wheel is provided with a circumferential groove 221 extending around the edge of the wheel to receive the lower edge of the timing pawl 222 of the trip assembly 25. A plurality of substantially U-shaped clips 223 are fitted over the edge of the timing wheel and spaced around the circumference of the wheel. The bight portion of each of the clips extends across the edge of the timing wheel over the slot 221. As the timing wheel rotates counterclockwise, as seen in FIGURE 2, the bight of each of the clips 223 engages the bottom cam surface 224 of the pawl 222 raising the pawl to pivot the bar 225 counterclockwise around the shaft 230 moving the left end of the bar away from the pin 231 of the pilot valve 30 allowing the pressure in the conduit 31 to open the valve. The pilot valve may be any suitable form of valve which is normally held open by the pressure of the fluid flowing through the valve. As illustrated in FIGURE 2, the valve may be a simple needle valve having an inlet passage 30a connected with an outlet passage 30b interconnected through a valve seat 30c. The conical upper end of the needle-shaped pin 231 is held against the valve seat 30c by the bar 225. The shaft of the pin 231 fits loosely through the valve body 30 to allow the fluid in the line 30 to bleed off around the pin when the valve is closed by the bar 225 to relieve the pressure on a motor valve connected to the line 31 so the motor valve may close. When the left end of the bar is lowered by the timing wheel away from the pin 231 the pressure in the passage 30a forces the pin downwardly away from the seat to allow flow through the valve. When the bar pushes the pin against the seat fluid cannot flow through the valve. The number of clips 223 employed on the timing wheel determines the number of times the pilot valve opens during each revolution of the wheel. The spacing of the clips around the wheel determines the time interval between the opening of the valve. The valve is opened each time a clip engages and lifts the pawl. The length of the cam surface 224 engaged by each of the clips determines the length of time that the valve remains in the open position. As will be explained below, the relative positions of the timing pawl and the bar 225 are adjustable for the purpose of controlling the length of the cam surface 224 which is engageable by each of the clips.

The trip assembly 25 is pivotally supported from the mounting plate 201 on the shaft 230 which extends through the plate as shown in FIGURE 3. Both, the bar 225 and the timing pawl 222 are pivotally supported on the shaft 230. The timing pawl is supported within and extends through an elongated vertical slot 232 in the bar. A coil spring 233 is wrapped around the enlarged section 234 of the shaft 230 to provide a clockwise bias to the bar and a counterclockwise bias to the timing pawl as viewed in FIGURE 2. The inward end of the coil spring is secured to the mounting plate 201 by the bolt 235. The coil spring is hooked over the bar at 240 so that the tendency of the spring to uncoil applies a downward force to the bar biasing the bar in a clockwise direction as viewed in FIGURE 2 causing an upward force by the left end of the bar against the pin 231 of the pilot valve. The outward upper end of the spring 233 is hooked into the timing pawl through the hole 241 in the pawl above the bar and the spring is bent in such a way that its engagement with the pawl causes the pawl to be biased in a counterclockwise direction around the shaft 230 against the lower end of the adjusting screw 242. Rotation of the adjusting screw pivots the timing pawl about the shaft so that the position of the pawl relative to the bar may be changed. Lowering the timing pawl relative to the bar increases the length of the cam surface 224 of the pawl which may be engaged by the clips 223 during their movement therepassed as the timing wheel rotates and thus increases the time period during which the pawl and bar are cammed counterclockwise by the clip to allow the valve 30 to remain open. Rotation of the adjusting screw 242 to raise the timing pawl relative to the adjusting arm reduces the length of the cam surface on the pawl engageable by the clips and thus reduces the length of time that the valve 30 is open each time a clip engages the timing pawl.

A cover 243, shown in fragmentary form only in FIGURE 1, is hinged on the base 33 to protect the timing device from the weather and make it readily accessible for service. The cover is pivotally connected to the hinge members 244 and is latched closed by a pin 245 inserted through the tongue 250 on the cover received between the lugs 251 on the base when the cover is closed.

The timing device may serve a number of automation functions, such as control of the frequency and duration of gas injection in a gas lift operation carried out for recovering oil from wells as illustrated diagrammatically in FIGURE 10. In operation, the timing device is connected by the conduit 151 to a suitable fluid supply source, which, in the gas lift operation, may be the line 191 carrying the lift gas. The apparatus to be controlled by the timing device, the motor valve 260, is connected to the outlet 200 of the conduit 31 with the input 195 of the conduit being connected to a gas supply source. The input 195 may be also connected to the line 191, or if desired or required by the system the timing device is used in, the input may be connected to a separate gas supply. A suitable motor valve is illustrated at page 3729, Composite Catalog of Oil Field Equipment and Services, 1964–65 edition, published by World Oil, Houston, Tex. The motor valve is operated by the timing device by control of the flow of gas through the conduit 31 to the motor valve with the motor valve in turn controlling the supply of lift gas to the oil well. The frequency with which the valve 30 of the timing device opens determines the frequency at which lift gas is supplied to the oil well and the length of time that the valve 30 remains open determines the quantity of lift gas introduced into the well each time the motor valve opens. The supply gas for operating the timing device passes through the pressure regulator 192 in the conduit 151 so that the pressure of the gas is reduced to the level required by the timing device. Since the chamber 40a below the diaphragm is relatively small and the timing device operates at a relatively low speed, the regulator 192 reduces the gas pressure to a level which may be, for example, as low as about 6 p.s.i.

Assume for purposes of explaining operation of the timing device that the diaphragm and motion translation assemblies are in the downward positions illustrated in FIGURE 4. The control lever 131 of the valve 32 is in the downward position. With the lever 131 in the downward position, the connection between the valve lever and link in the conical recess 163 is in the upward position so that the link holds the valve element 173 downward on the valve seat 182 to allow the supply gas in the conduit 151 to flow through the valve seat 181 around the upper end of the valve element into the conduit 134. The supply gas flows through the choke bean 144 which meters the gas flow and through the conduit into the chamber 40a below the diaphragm 35. The size of the orifice through the choke bean together with the pressure of the supply gas within the conduit at the upstream side of the orifice determines the rate of flow of the gas into the chamber below the diaphragm. The orifice through the choke bean may be quite small, as, for example, in one model of the timing device designed to be operated by gas at a pressure of about 6 p.s.i., the orifice was 0.014 inch in diameter.

The supply gas entering the lower chamber below the diaphragm displaces the diaphragm upwardly compressing the spring 63 and lifting the shaft 54 which raises the bifurcated member 85. As the racks 92 and 93 on the arms 90 and 91 are raised with the upward movement of the member 85, the pinions 94 and 95 are rotated by the racks. The pinion 94 rotates freely around the hub 114 as it is tending to uncoil the spring 120 while the pinion 95 tightens the spring 112 causing engagement of the pinion with the hub 102 to rotate the shaft 96 in a clockwise direction as viewed in FIGURES 4 and 7. The flow of supply gas continues with the diaphragm moving upwardly until the lower arm 133 on the bracket 124 engages the valve lever 131 lifting the lever until it moves slightly past its horizontal or center position at which time the spring 165 will pull the valve lever and valve link toward each other causing the lever and link to snap to the position illustrated in FIGURE 6 and shown by the broken line representation of the lever in FIGURE 4. When the valve lever and link snap to position of FIGURE 6, the valve element 173 is raised by the link to an upper seated position against the valve seat 181 closing off the flow of supply gas from the conduit 151 and stopping the upward movement of the diaphragm. At the upper end position of the diaphragm the upper ends of the arms 90 and 91 are received within the chamber 71a of the head 71 of the support frame. At the same time the valve element seats against the upper valve seat fluid communication is established between the conduits 134 and the outlet or exhaust passage 153 from the valve body.

With the flow of the supply gas stopped and the chamber 40a below the diaphragm vented to the atmosphere through the conduit 134, around the lower end of the valve element 173, and outwardly through the flow passage 153, the compressed coil spring 63 begins expanding, displacing the diaphragm 35 downwardly. The supply gas in the lower chamber exhausts through the conduit 134 and the choke bean 144 to the atmosphere out of the outlet passage 153 in the control valve. The rate at which the coil spring displaces the diaphragm downwardly is affected by the metering of the supply gas through the flow bean similarly as the upward rate of the diaphragm is affected by the flow of supply gas into the lower chamber through the flow bean. As the racks 92 and 93 move downwardly the pinion 95 uncoils the spring 112 allowing the pinion to rotate freely around the hub 102 while the pinion 94 tightens the spring 120 turning the hub and continuing the clockwise rotation of the shaft 96. When the spring has displaced the shaft and the member 85 downwardly sufficiently for the upper arm 132 of the bracket 124 to push the valve lever 131 downwardly past the center position, the control valve 32 will snap back to the position illustrated in FIGURE 4 when the valve element 173 will move downwardly closing off the exhaust of supply fluid from the lower chamber and again permitting supply fluid to flow from the conduit 151 into the lower chamber to again displace the diaphragm upwardly.

The extreme upward movement of the diaphragm is limited by the engagement of the upper face of the plate 52 with the lower face of the bushing 80 and the flange 65 and the downward movement is limited by the engagement of the lower end of the member 85 with the top face of the wiper 84. In actual operation of the timing device however, with the particular control valve 32 shown, the diaphragm and the motion translation assembly will not move to the extreme end positions. Due to the snap action function of the connection between the valve lever 131 and the valve link 164, the valve lever needs to be moved only slightly past the horizontal position for the valve to snap to the opposite position causing the shift between the supply and exhaust conditions. The bracket 124 is not required to move quite the full distance traversed by the valve lever. As the lower bracket arm moves the valve lever upwardly the valve lever will snap to its upward position as soon as it is past the horizontal so that the lever will move slightly away from and above the arm of the bracket. When the valve lever shifts upwardly and cuts off the supply of gas to the chamber below the diaphragm, the diaphragm will cease moving upwardly and therefore the diaphragm assembly will stop with the arm 133 on the bracket trailing or slightly below the upper position of the valve lever. The same situation will occur as the diaphragm assembly moves the bracket downwardly with the valve lever snapping to the lowermost position slightly below the location where the diaphragm and motion translation assemblies stop moving downwardly, as shown in FIGURE 4. It will, therefore, be seen that the diaphragm will stop its upward movement slightly before the plate 52 engages the lever face of the bushing 80 and will stop its downward movement slightly before the lower end of the member 85 engages the upper face of the wiper 84. The expansion of the spring 63 and thus the downward movement of the diaphragm ceases when exhaust of the gas from the lower chamber is cut off and the flow of supply gas is again started into the lower chamber.

The rotation of the shaft 96 in the manner above described effects operation of the gear assembly 23 and the pinion 215 and gear wheel 214 to turn the timing wheel 24 in a counterclockwise direction as viewed in FIGURE 2. As each of the clips 223 on the timing wheel engages the cam surface 224 on the timing pawl 222 the pawl is lifted raising the right end of the bar 225 of the trip assembly pivoting the bar counterclockwise around the shaft 230 causing the left end of the bar to move downwardly away from the pin 231 of the valve 30. The valve 30 is a type needle valve in which the gas pressure within the valve opens the valve when the pin is not held in a closed position. Therefore, when the bar moves downwardly away from the pin, the pressure within the valve causes the valve to open permitting gas flow through the conduit 31 to the motor valve 260 of the gas lift system. So long as the clip on the timing wheel is engaged with the cam surface of the timing pawl the left end of the arm is away from the pin 231 to allow the valve 30 to be open. As soon as the clip on the timing wheel passes the upper end of the cam surface, the spring 233 which is constantly biasing the trip assembly in a clockwise direction will pivot the bar and timing pawl clockwise with the left end of the bar pressing the pin 231 to close the valve

30. The timing pawl moves downwardly between adjacent clips into the slot 221 of the timing wheel. The trip assembly remains in this position with the valve 30 closed until the next clip on the timing wheel engages the cam surface to lift the pawl and open the valve again.

The length of time that the bar is held in the counterclockwise position to allow the valve 30 to be open is dependent directly upon the length of the cam surface 224 which is engageable by each of the clips at a given speed of the timing wheel. It will be evident that in the position of the timing pawl illustrated in FIGURE 2, each of the clips may engage only a short length of the cam surface of the timing pawl and thus the bar will be held away from the pin of the valve 30 only a short time so that the open period of the valve will be short. When the adjusting screw 243 is rotated to move the timing pawl downwardly relative to the bar 225 a greater length of the cam surface 224 will be engageable by each of the clips so that each clip will hold the bar away from the pin of the valve 30 for a longer period of time allowing the valve to be open longer. Thus, the valve 30 is opened each revolution of the timing wheel the number of times there are clips 223 on the timing wheel and each time the valve is opened it is permitted to remain open a length of time dependent upon the length of the cam surface of the timing pawl which is engageable by each of the clips. It will be evident, of course, that other factors are involved in the frequency of operation of the valve 30 and the length of time it is open each time it operates. For example, the speed of rotation of the timing wheel, the length of the adjusting arm, the distance the pin 231 must move to allow the valve 230 to open, and other similar structural features of the device affect its operation. Operation of the device is readily changed by variation in the number and spacing of the clips around the timing wheel and by adjustment of the position of the timing pawl.

It will be apparent that other forms of three way valves 32 may be employed in the timing device. Any suitable valve which will alternately permit supply of driving fluid to the diaphragm chamber and permit exhaust of the fluid from the chamber in accordance with the positioning of the motion translation assembly will be suitable for use in the timing device.

It will also be clear that the rate at which the diaphragm 35 moves upwardly is affected by the size of the orifice through the choke bean 144 and the pressure at which gas is supplied to the timing device. Changes in the supply gas pressure and/or the choke bean must be correlated with a change of or adjustment in the coil spring 63 since such spring performs the function of returning the diaphragm through its downward stroke. The upward and downward strokes of the diaphragm should be at the same speed and therefore changes which would alter the upward movement of the diaphragm by variation in the volume in supply gas should be coordinated with changes in the coil spring so that it will return the diaphragm downwardly at the same rate that the supply gas displaces the diaphragm upwardly.

Other variations, in addition to those previously mentioned, such as the number and position of the clips employed on the timing wheel, the adjustment of the timing pawl, and alterations in the choke bean and the return spring on the diaphragm, which may serve to alter the rate of operation of the timing device, are changes such as in the gear assembly 23 which determines the rotational speed of the timing wheel relative to the speed of the shaft 96. For example, in some models of the timing device gear trains were made which provided for rotation of the timing wheel once each 2, 6, 12, or 24 hour period.

The timing device may be further altered to provide control for a plurality of devices such as the motor valves. The shaft 96 may be extended and several timing wheels mounted on the shaft parallel to each other and spaced apart along the length of the shaft. Each of the wheels is provided with its own trip assembly and pilot valve supported from the mounting plate 201 over the timing wheels. Thus, a single power assembly may drive several timing wheels to perform timing functions for several separate wells. The clips and timing pawl for each wheel may be adjusted to the requirements of each well. FIGURE 17 illustrates such an arrangement. The pilot valves 30 are secured together from the plate 201 with a common conduit 31 leading to all of the valves. The shafts 230 and 212 are extended and supported on a bracket 270 secured to the mounting plate. A separate conduit 31 leads from each pilot valve to permit control of a separate motor valve for each pilot valve. Each trip assembly and timing wheel controls the timing function of its respective pilot valve.

It will be seen that there has been described and illustrated a new and improved fluid actuated timing device.

It will be further seen that the timing device is driven by a substantially constant supply of fluid, such as a gas, supplied to the device to produce timed mechanical movement.

It will be further seen that the timing device employs a single diaphragm which is displaced in one direction by the supply fluid under pressure and in the opposite direction by a spring compressed during the movement of the diaphragm by the supply fluid.

It will be additionally seen that the timing device includes a choke bean which meters a supply fluid to the diaphragm chamber to displace the diaphragm for producing the periodic mechanical movement.

It will also be seen that the timing device utilizes the reciprocating action of a flexible diaphragm translating the action into rotational motion to drive a timing wheel.

It will also be seen that the longitudinal motion of a shaft moved by the reciprocating diaphragm actuates a control valve in the conduit conducting the supply fluid to the diaphragm chamber.

It will be further seen that the timing function of the device is adjustable from the standpoint of both the number of timing functions performed during a given period of time and the duration of each of the timing functions.

It will also be seen that the timing functions of the timing device are controllable in response to changes in quantities of the metered fluid supplied to the diaphragm chamber.

It will be additionally seen that the timing device has a pressure chamber to which the diaphragm is exposed and into which a driving fluid is metered for displacing the diaphragm in one direction and out of which the driving fluid is metered during exhaust of the fluid from the chamber while the diaphragm is being displaced in the other direction by a spring on the opposite side of the diaphragm from the pressure chamber.

It will be further seen that the timing device includes a motion translation assembly in which longitudinal reciprocating action is converted to rotational motion to drive a timing wheel.

It will also be seen that the timing device includes a timing wheel and a timing pawl both of which are adjustable to vary the number and duration of timing functions performed by the timing device during a given period of time.

It will be further seen that the timing device is continually operable so long as fluid under pressure is supplied to the device and thus problems of frequent windings inherent in conventional clock-operated timing devices are eliminated.

It will also be seen that the timing device includes a three-way, two position, valve which in one position permits a supply of fluid to flow to the diaphragm chamber and in another position permits the supply fluid to be exhausted from the diaphragm chamber, the valve being actuated by the reciprocating motion of a shaft secured to the diaphragm of the device.

It will be seen that the timing device may be employed to drive recorders, control valves, and perform other operations requiring unattended performance of timing functions inherent in many automated systems.

It will additionally be seen that the timing device may include a plurality of timing wheels, trip assemblies, and pilot valves to perform several separate and independent timing functions from a single power unit.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fluid actuated timing device comprising: a housing having an upper section and a lower section secured together by an external annular clamp extending around outwardly extending annular flanges on each of said sections; a flexible diaphragm secured within said housing dividing said housing into a lower pressure chamber and an upper spring chamber, said diaphragm having an annular circumferential bead clamped between said annular flanges on said sections of said housing to hold said diaphragm in fluid-tight relationship with said sections of said housing; a drain valve in said lower housing section opening into said lower pressure chamber for draining fluids from said chamber; a diaphragm shaft secured at the lower end thereof to said diaphragm substantially at the center thereof, said shaft extending through the upper section of said housing, the upper end of said shaft being above said housing; means comprising upper and lower plates secured around said shaft on either side of said diaphragm for rendering a major portion of said diaphragm substantially rigid leaving an annular section of said diaphragm around said plates flexible to permit reciprocating motion of said diaphragm between a lower position and an upper position; a support frame secured on said upper section of said housing, said support frame having a head member and a base member interconnected by vertical supports, said base member having a downwardly extending annular flange positioned through a central opening in said upper housing section around said diaphragm shaft; a bushing engaged within said flange on said base member around said diaphragm shaft, said bushing being loosely fitted around said shaft to guide said shaft while permitting air to flow into and out of said spring chamber during reciprocating motion of said diaphragm; a conically shaped coil spring positioned within said spring chamber around said diaphragm shaft confined between said upper plate on said diaphragm and the inner surface of the top of said upper section of said housing, each of the internal coils of said spring being nestable within and around adjacent coils whereby said spring may be compressed to a minimum depth to permit maximum movement of said diaphragm; a conduit connected into said lower pressure chamber of said housing for supplying fluid to said pressure chamber and exhausting fluid from said pressure chamber whereby said diaphragm may be displaced upwardly from said lower position by said fluid and said fluid may be exhausted from said pressure chamber while said spring is displacing said diaphragm downwardly from said upper position to said lower position; a three-way, two-position control valve secured in said conduit to said pressure chamber, said valve having an outlet flow passage connected into said conduit, an inlet flow passage, and an exhaust flow passage, said valve having a control lever for moving said valve between a first position wherein said inlet and outlet passages are interconnected for allowing supply fluid to pass through said valve into said supply and exhaust conduit to said lower pressure chamber and a second position closing off said inlet flow passage and interconnecting said outlet flow passage and said exhaust flow passage for permitting said supply fluid to be exhausted from said lower pressure chamber through said supply and exhaust conduit and said control valve outwardly from said valve through said exhaust flow passage; a choke bean in said conduit between said valve and said lower pressure chamber for metering fluid into and out of said lower pressure chamber through said conduit to control the rate of reciprocating movement of said diaphragm; a bifurcated member secured to the upper end of said diaphragm shaft and having vertically extending parallel spaced apart arms, each having a rack formed thereon; said bifurcated member being slidable between said vertical supports of said support frame; a guide pin through one of said supports into a vertical slot in one of said arms of said bifurcated member for maintaining the alignment of said member while reciprocating between said supports; a rotatable shaft supported from said head member of said support frame extending between said arms of said bifurcated member; at least two pinion gears on said shaft, each of said pinion gears being engageable with one of said racks on said bifurcated member; clutch means between each of said pinion gears and said shaft permitting said pinions to rotate said shaft in one direction responsive to reciprocating motion of said bifurcated member; a bracket on one of said arms of said bifurcated member engageable with said control lever on said control valve for moving said valve between said first and said second positions responsive to reciprocating motion of said bifurcated member effected by displacement of said flexible diaphragm within said housing by said supply of fluid and said spring; a timing wheel supported from said support frame operatively engaged with said shaft; a trip assembly supported from said support frame operable by said timing wheel in a predetermined timed sequence responsive to the rotation of said timing wheel; and a pilot valve operable by said trip assembly for controlling fluid flow through a conduit in a predetermined timed sequence responsive to the motion of said timing wheel and said trip assembly.

2. A fluid actuated timing device according to claim 1 including a pressure regulator connected in said supply conduit for controlling the pressure of the supply fluid provided to said control valve.

3. A fluid actuated timing device according to claim 1 wherein said timing wheel and said trip assembly each are adjustable for varying the time sequence function performable by said timing device.

4. A fluid actuated timing device according to claim 1 including: a plurality of timing wheels supported on said rotatable shaft; a trip assembly supported over and engageable with each of said timing wheels; and a pilot valve operably associated with each of said trip assemblies.

5. A fluid actuated timing device according to claim 1 wherein a plurality of said timing wheels, said trip assemblies, and said pilot valves are supported on said device for performing a plurality of independent time sequence functions from a single diaphragm actuated shaft.

References Cited

UNITED STATES PATENTS

| | | | |
|---|---|---|---|
| 2,106,094 | 1/1938 | Griffey | 137—624.14 |
| 2,814,310 | 11/1957 | Lower | 137—624.14 X |
| 3,064,628 | 11/1962 | Canaligo | 91—347 X |
| 3,209,748 | 10/1965 | Thomas | 137—624.14 X |

ALAN COHAN, *Primary Examiner.*